(12) United States Patent
Susnjara

(10) Patent No.: US 8,109,391 B2
(45) Date of Patent: Feb. 7, 2012

(54) METHOD AND MEANS FOR FACILITATING MATERIAL HANDLING

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 312 days.

(21) Appl. No.: 12/391,419

(22) Filed: Feb. 24, 2009

(65) Prior Publication Data

US 2010/0213107 A1    Aug. 26, 2010

(51) Int. Cl.
    *B07C 5/02* (2006.01)
(52) U.S. Cl. .......... 209/3.3; 209/702; 700/171; 700/219
(58) Field of Classification Search .................... 209/3.3, 209/702, 942; 700/97, 171, 219
    See application file for complete search history.

(56) References Cited

U.S. PATENT DOCUMENTS

| | | | |
|---|---|---|---|
| 3,765,349 A * | 10/1973 | Gerber | 112/470.13 |
| 3,864,997 A * | 2/1975 | Pearl et al. | 83/49 |
| 3,895,358 A * | 7/1975 | Pearl | 700/1 |
| 4,901,359 A * | 2/1990 | Bruder | 382/111 |
| 5,141,572 A * | 8/1992 | Gerber | 156/64 |
| 5,230,765 A * | 7/1993 | Weiselfish et al. | 156/350 |
| 6,222,155 B1 * | 4/2001 | Blackmon et al. | 219/121.39 |
| 6,298,275 B1 * | 10/2001 | Herman, Jr. | 700/130 |
| 2002/0072824 A1 * | 6/2002 | Susnjara | 700/171 |

* cited by examiner

*Primary Examiner* — Joseph C Rodriguez
(74) *Attorney, Agent, or Firm* — Novak Druce + Quigg LLP

(57) ABSTRACT

A method of facilitating a sorting of a plurality of components nested in a workpeice, including at least two sets of components, each adapted to be assembled to form a structure, comprising producing a plan replicating the cut pattern of the workpiece, depicting the profiles of the components, each provided with an identifier denoting the location of the component on the workpiece; producing at least one of a plurality of labels, each bearing a distinguishable one of the location indicators and a distinctive, readily visable identifier denoting a different one of the sets of components; applying each of the labels on a nested component of the workpiece corresponding to the profile of the component on the plan, guided by the plan and the applicable location identifiers; removing each of the nested components provided with labels bearing the same readily, visable identifier and grouping all components provided with labels bearing the same identifier, together.

10 Claims, 7 Drawing Sheets

METHOD AND MEANS FOR FACILITATING MATERIAL HANDLING

This invention relates to a method and means for facilitating assorting of a plurality of components nested on a worktable of a machine, including components of different sets of components intended for assembly of different structures.

BACKGROUND OF THE INVENTION

In the manufacture of cabinetry such as kitchen cabinets and the like, it is a common practice to form the basic components usually consisting of a set of panels, assembling certain sets of such panels to form two or more cabinets and then forming an ensemble by assembling the individual cabinets together. Typically, such panels are formed from large, raw material woodpieces loaded onto the worktable of a CNC machine, usually a router, such machined panels are removed from the worktable of the machine and sorted into groups of panels with respect to the cabinet to which they apply, the groups of sorted panels are assembled to form constituent cabinets and such cabinets are assembled together, usually at an installation site to complete the cabinetry.

To efficiently use such workpieces to provide a maximum number of usable panels with a minimum amount of scrap material, the controllers of such CNC machines are programmed to arrange for cutting patterns which will yield the maximum number of usable pieces and a minimum amount of scrap material. Such cutting patterns invariably result in a cutting pattern in which the resulting cut components are nested in the raw material workpeice in a dispersed manner, requiring a workman assigned to remove and sort such pieces to ascertain the identification of the particular components applicable to a particular cabinet. Such sorting process can be time consuming and often imprecise, materially decreasing productivity. Such process particularly is unproductive where the workman may be unskilled and/or inexperienced.

Accordingly, it is the principal object of the present invention to provide a novel method and means for allowing an unskilled and/or inexperienced workman to readily remove machined components of different sets of components from a plurality of such components nested on the worktable of a machine, and sort such components into sets for transfer to and/or assembly to form a number of structures such as a set of cabinets.

SUMMARY OF THE INVENTION

The principal object of the present invention is achieved by providing a method of facilitating a sorting of a plurality of cut components nested in a raw material workpeice disposed on a worktable, including at least two sets of components, each of which set of components is adapted to be assembled to form a structure, comprising producing a plan of the cut pattern of the raw material workpeice, depicting a replica of the profiles of the plurality of components on the worktable, with each component provided with an identifier denoting the location the component on the raw material workpeice; producing at least two sets of labels, each label of each set bearing a distinguishable one of the location indicators and a distinctive, readily visable identifier denoting a different one of the sets of components and applying each of the labels on a nested component of the raw material workpeice corresponding to the profile of the component in the plan, guided by the plan and the applicable location identifier; removing the nested components from the raw material workpeice, provided with labels bearing the same readily, visable identifier; and grouping all removed components provided with labels bearing the same identifier, together. In another embodiment of the invention in which the structure to be formed by the identified set of components is intended to be assembled with another structure to form a composite structure, such labels are provided with a second, different readily visable identifier denoting such composite structure.

DETAILED DESCRIPTION OF THE PREFERRED EMBODIMENTS OF THE INVENTION

Figure 1:
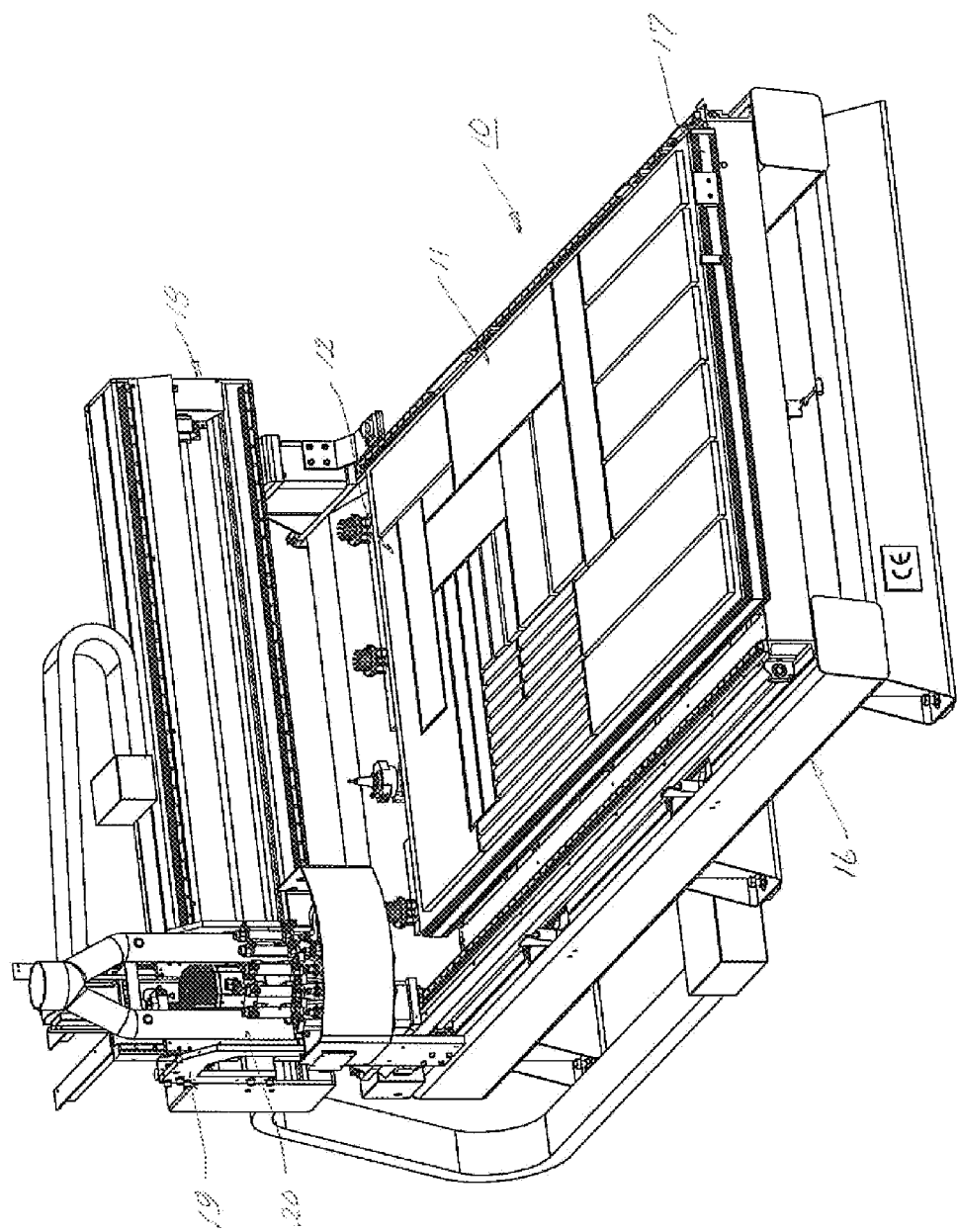
FIG. 1 is a perspective view of a CNC router with which the claimed invention may be practiced, provided with a raw material workpiece on the worktable thereof in which the profiles of a plurality of components have been cut.
Figure 6:
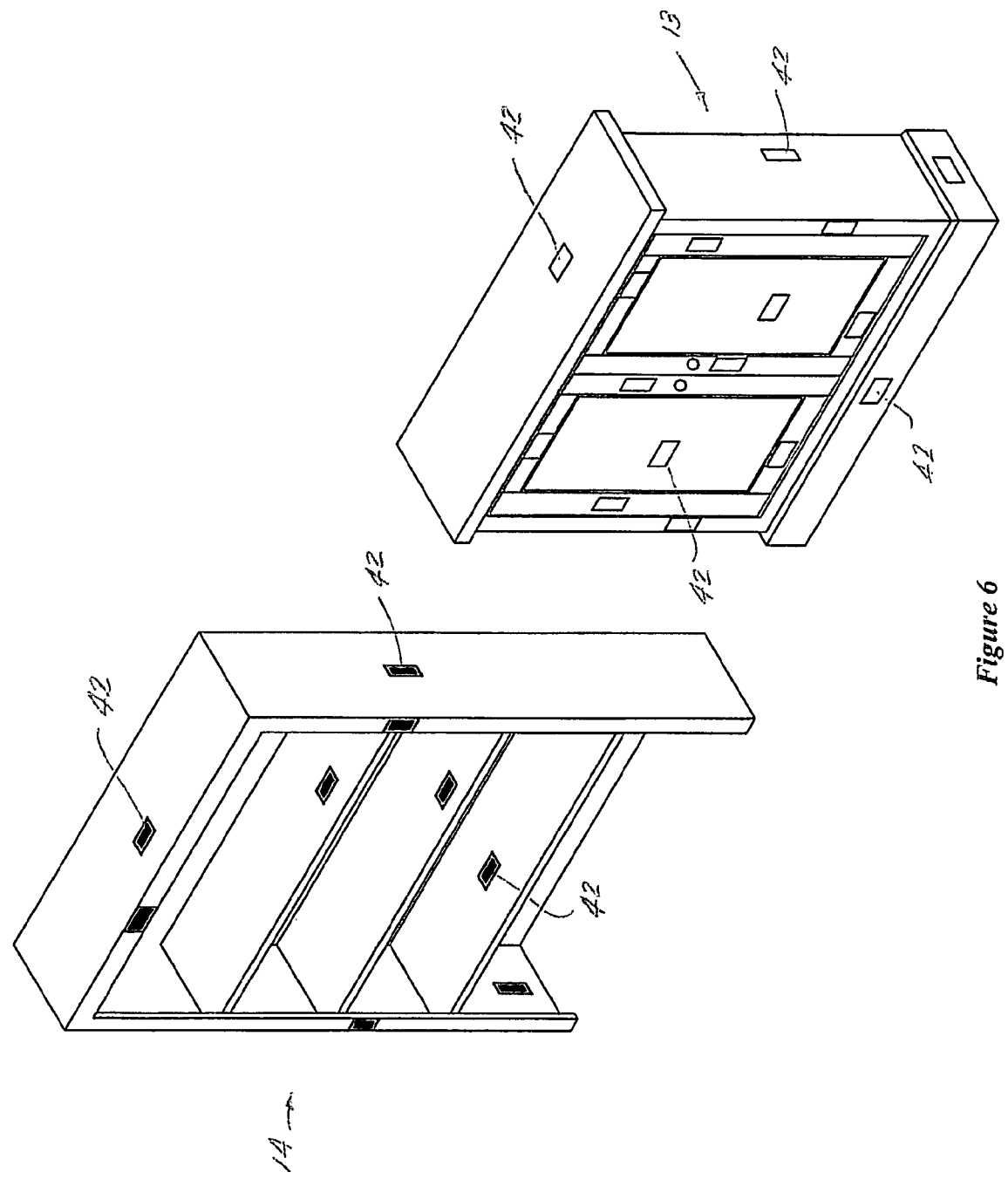
FIG. 6 is a perspective view of two separate structures formed from the labeled components shown in FIG. 5.
Figure 7:
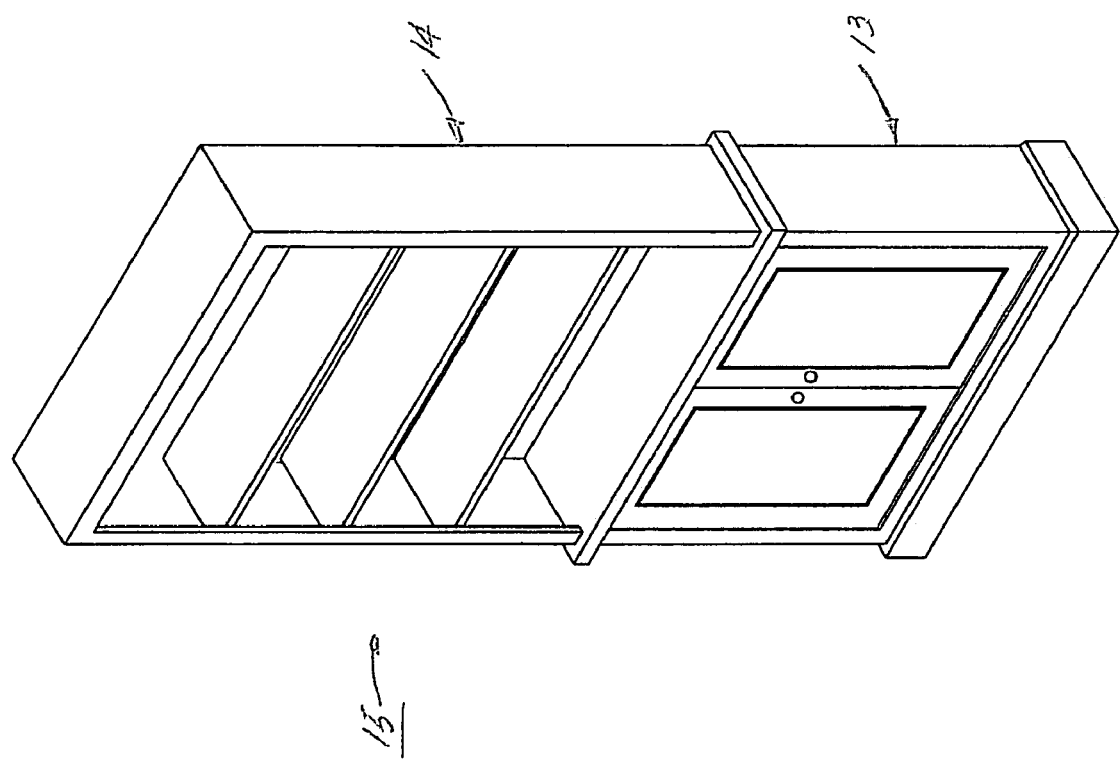
FIG. 7 is a perspective view of a composite structure consisting of a combination of the structures shown FIG. 6.

Referring to FIG. 1 of the drawings, there is illustrated a CNC router 10 operated by a programmable controller which may be utilized to cut a plurality of panels 11 from one or more raw material workpieces 12 to form a pair of units 13 and 14 as shown in FIG. 6, to further form a composite unit 15 as shown in FIG. 7 consisting of a combination of units 13 and 14. The router is of a conventional construction including a base 16 provided with a worktable 17 upon which raw material workpeice 12 is adapted to be mounted, a gantry 18 supported on the base member and displaceable along an X-axis, a toolhead support assembly 19 mounted on the gantry and displaceable transversely along a Y-axis and a toolhead assembly 20 supported on the toolhead support assembly and displaceable vertically along a Z-axis. The controller of the router is programmed in the conventional manner to determine the number and profiles of the plurality of panels 11 required to form units 13 and 14, nest such panels on workpeice 12 and possibly additional workpieces in a manner to maximize the use of the raw material workpiece or workpieces required, and minimize the amount of scrap material, generate a cut plan and guide the cutting tools of the machine to produce the plurality of panels. In addition, such program would provide for the controller printing out plan 30 as shown in FIG. 2 and a strip of labels 40 as shown in FIG. 3.

Figure 2:
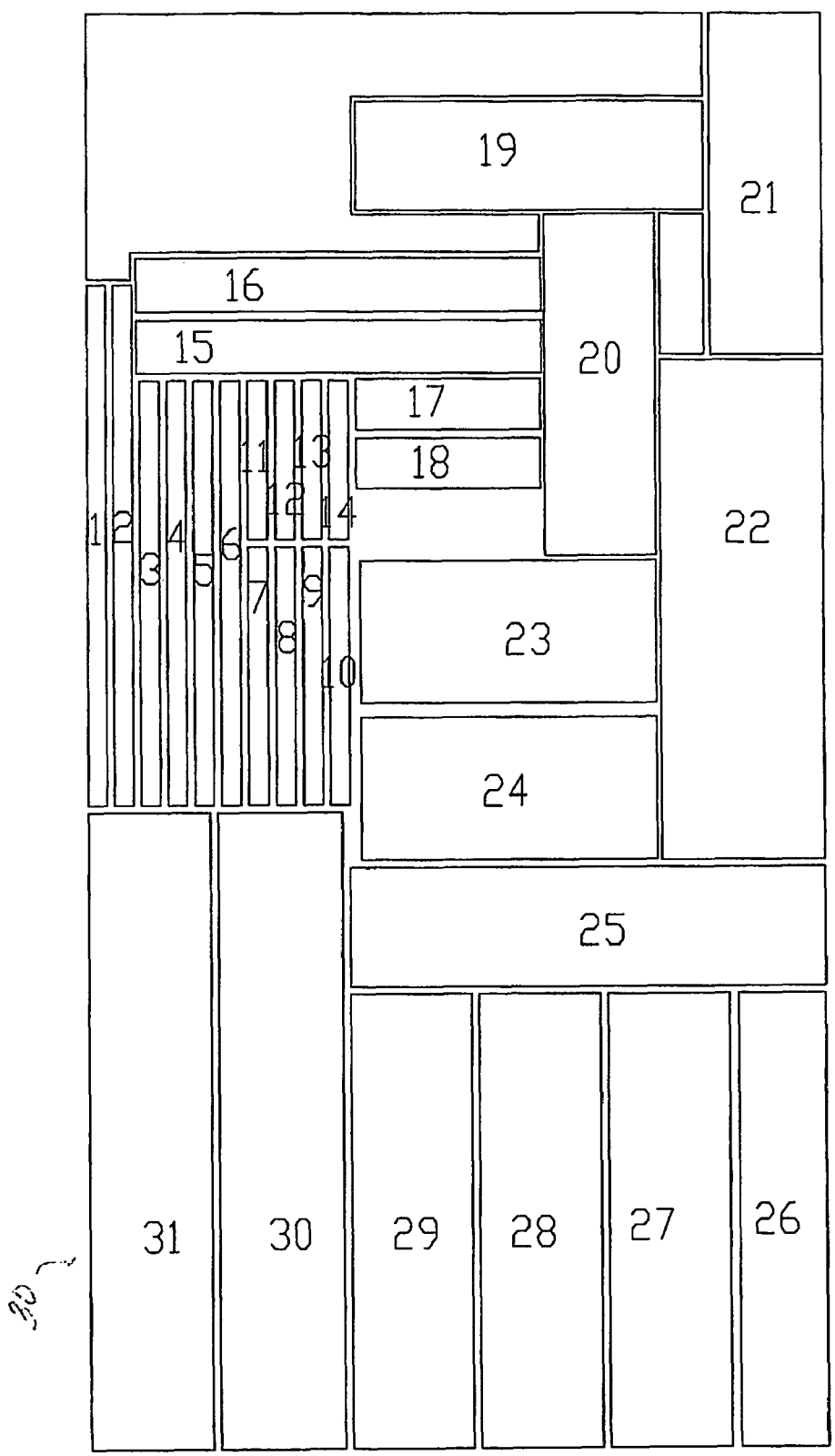
FIG. 2 is a plan depicting a replica of the cut pattern of the raw material workpeice shown in FIG. 1.
Figure 3:
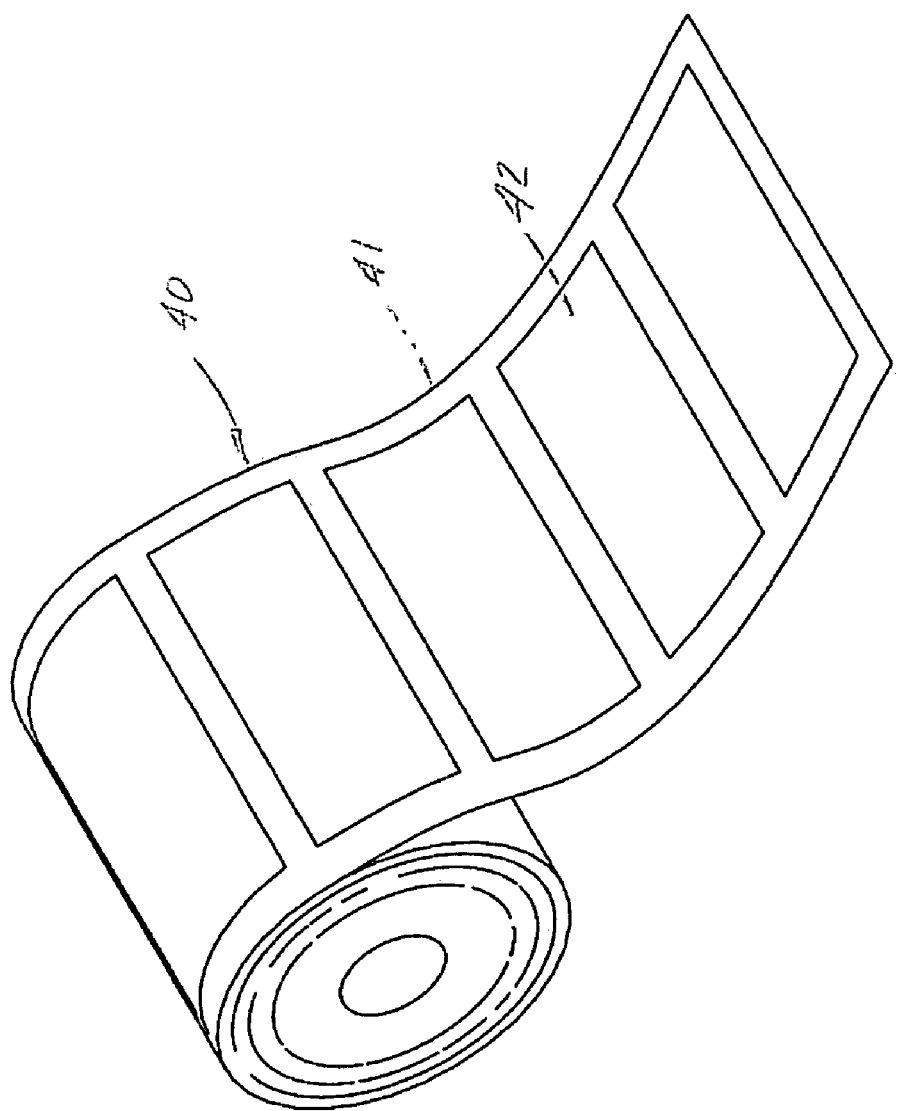
FIG. 3 is a rolled strip provided with detachable labels.
Figure 4B:
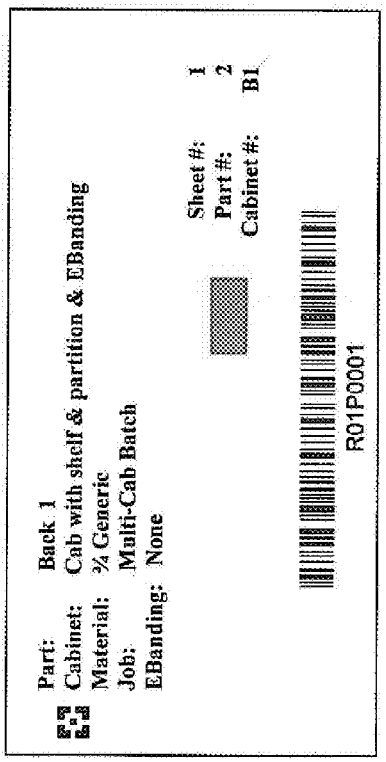
FIGS. 4a and 4b are enlarged plan views of the labels provided on the rolled strip shown in FIG. 4, provided with certain information thereon.
Figure 4A:
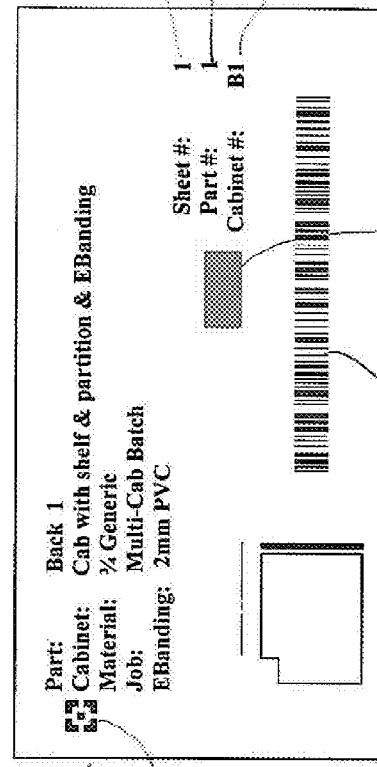

Referring to FIG. 2, plan 30 consists of a printout of the controller of the router, which is a replica of the plurality of panels nested on workpiece 12 with the panels marked with a set of numerals. Strip 40, also a printout of the controller of the machine, consists of a backing strip 41 on which there is removably attached a set of labels 42. Such labels are each provided with an adhesive back surface and may be adhesively attached to strip 41 in a manner in which it may be readily removed or may be formed as an integral part of strip 41 with perforated boundary lines permitting it to be removed from strip 41. As shown in FIGS. 4a and 4b, each of labels 42 has imprinted thereon certain information pertaining to a particular panel of the plurality of panels 11 nested on the worktable of the machine, the particular placement of which is indicated by plan 30.

The information imprinted on label 42a shown in FIG. 4a denotes the panel, the unit to which the panel relates, the material of the panel, the composite unit to which the unit of which the panel is a part relates, and any work to be performed on any edge portion thereof. If certain machining is to be performed on the reverse side of a panel, such work requirement is indicated by a bar code.

In providing guidance with respect to the particular panel to which a label relates, such label is provided with an indicator 42c which refers the user to plan 30, an indicator 42d which relates to a particular panel shown on plane 30 and an indicator 42e which identifies the unit of which the panel is component. In addition, the label includes a first, distinctive and readily visable identifier 42f denoting the panel is a component of a particular unit such as unit 13 or 14, and a second, distinctive and readily visable identifier 42g denoting the panel is a component of a unit such as unit 13 or 14 which in turn is a component of a particular composite unit such as composite 15. Identifier 42f may consist of a distinct color with each such color identifying a particular set of panels comprising the components of a particular unit such as unit 13 or 14. The colors selected should be contrasting so as to be visably dicernable. Identifier 42g may consist of a distinct symbol such as a circle, a polygon, a square, a triangle, an asterisk and the like, with each such symbol identifying a particular set of panels comprising the components of a particular unit which in turn is a component of a particular composite unit such as composite unit 15. Such symbols also should be distinctive so as to be visably dicernable.

Figure 5:
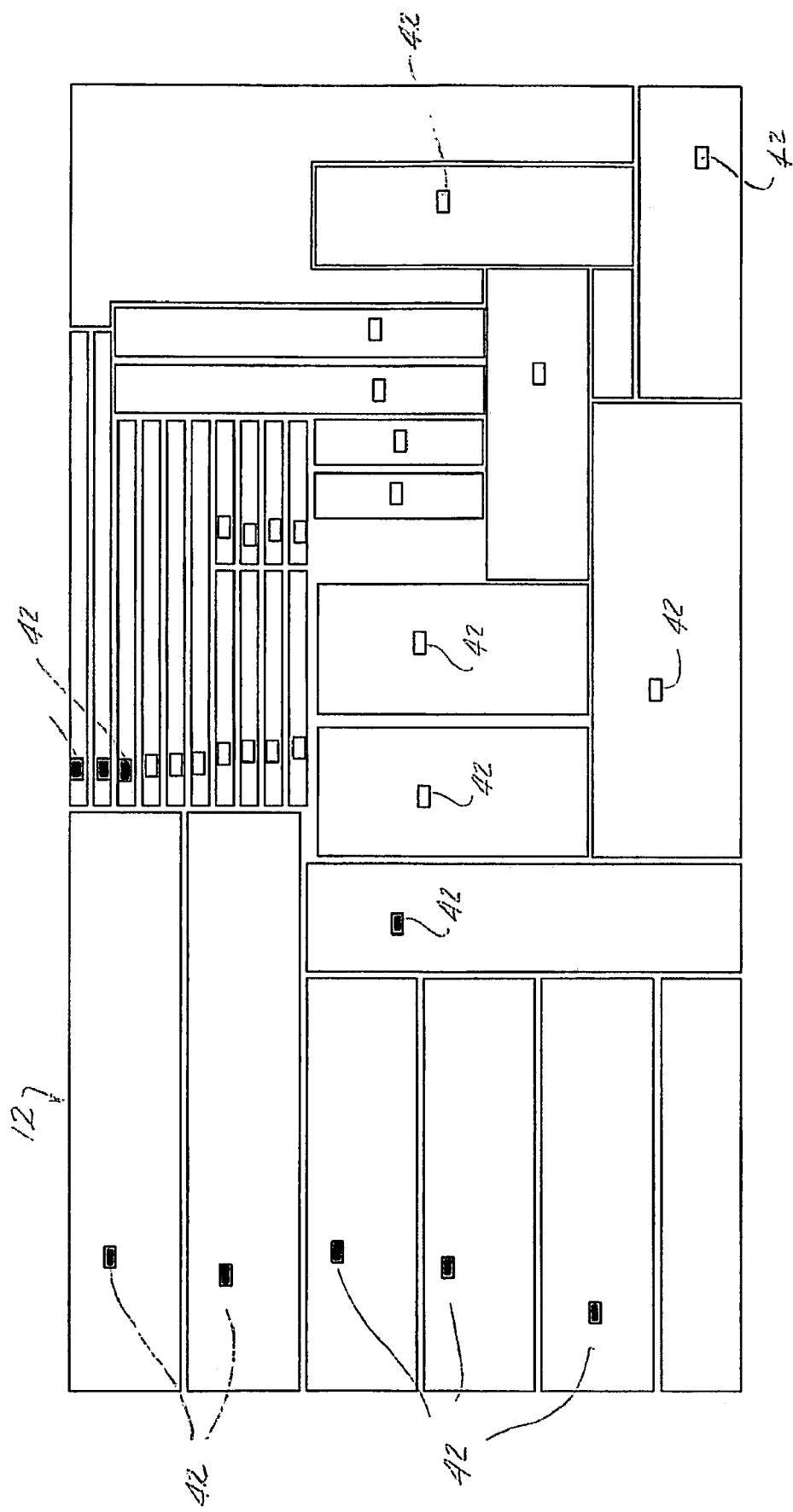
FIG. 5 is a plan view of the raw material workpeice shown in FIG. 1 in which the nested components thereof are provided with labels as shown in FIGS. 4a and 4b.

In the practice of the method as described in the manufacture of composite unit 17 shown in FIG. 7, the machine program as described would be executed to operate the router to produce the plurality of components 11 on worktable 12 as shown in FIG. 1, and cause the controller of the machine to generate plan 42 as shown in FIG. 2, providing a replica of the machined workpeice 12, provided with locator numerals, and strip 41 as shown in FIG. 3 including labels 42 each provided with readily dicernable identifiers 42f consisting of certain colors and identifiers 42g consisting of certain symbols, as shown in FIGS. 4a and 4b. Upon completion of such machining and printing procedures, a workman would remove each label 42 from strip 41, read part number 42d from the label, determine the location of the part nested in workpeice 12 on the worktable of the machine through the use of plan 42 designating such position, by means of matching part numbers, and place such label on the designated panel nested in the workpeice 12 supported on worktable 12. Upon repeating such procedure, each of the panels 11 nested in workpeice 12 will have a label 42 attached thereto as shown in FIG. 5, provided with a first identifier 42f in the form of a certain color denoting a panel of a unit 13 or 14, and a second identifier in the form of a certain symbol 42g. The workman would then remove and compile all panels from the nested panels 11 with labels of the same first color to provide a first set of panels applicable to unit 13, and then remove and compile all panels from the nested panels 11 provided with labels bearing the same second color to provide a second set of panels applicable to unit 14. Upon compiling such two sets of panels, the workman would remove from each of such sets, panels with labels of the same symbol to provide final sets of panels applicable to units 13 and 14 to be assembled and joined together to form composite unit 15 or another composite unit.

Alternatively, in shortcutting such procedure, the workman would remove and compile from the nested panels 11, panels with labels bearing the same first color and the same first symbol to provide a first set of panels applicable to a unit 13 intended to form composite unit 15, remove and compile from nested panels 11, panels with labels bearing the same first color and the same second symbol to provide a second set of panels applicable to a unit 13 intended to form a composite unit similar to but other than composite unit 15, remove and compile from nested panels 11, panels with labels bearing the same second color and the same first symbol to provide a third set of panels applicable to a unit 14 intended to form composite unit 15, and remove and compile from nested panels 11, panels with labels bearing the same second color and the same second symbol to provide a fourth set of panels applicable to a unit 14 intended to form a composite unit similar to but other than composite unit 15.

By simply scanning the nested panels and being visably drawn to the distinctive and visably discerning colors and symbols on the labels attached to the panels, usually adhesively, the workman can easily remove and sort the panels in a manner as described. He further can separate those panels bearing a bar code, indicating further reverse side machining, and bearing a pictorial representation indicating edging treatment, which can be reunited with their appropriate sets upon completion of such additional treatments through the use of such identifying colors and symbols, and further can confirm the sorting indication of the identifier colors and symbols by the imprinted text on the labels.

The method as described is applicable in circumstances where multiple raw material workpieces are used providing diverse nesting configurations which would require multiple printouts of plans replicating such configurations, and to the production of multiple composite units of the same or different designs.

Clearly the described method would not only permit the use of unskilled and/or inexperienced workmen for removing and sorting nested panels on a worktable but would substantially improve productivity.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of expeditiously and economically forming and sorting at least two different sets of components from at least one workpiece disposed on a worktable of a machine, each of said sets of components being adapted to be assembled to form a distinct product, comprising:

executing a CNC machine program functional to provide a cut pattern on said workpiece, nesting said components on said workpiece in a disposition maximizing a yield thereof;

producing a graphic plan replicating the cut pattern of said workpiece, depicting the profiles of said plurality of components, each provided with an identifier denoting the location of the component on said workpiece;

producing at least one of a plurality of labels, each bearing a distinguishable one of said location indicators and a distinctive, readily visable identifier denoting a different one of said sets of components;

manually applying each of said labels on a nested component of said workpiece corresponding to the profile of said component in said plan, guided by said plan and the applicable location identifier;

removing each of said nested components provided with labels bearing the same readily, visable identifier; and grouping all removed components provided with labels bearing the same identifier, together.

2. A method according to claim 1 wherein said location identifiers comprise one of a group consisting of numerals and alphabetical letters.

3. A method according to claim 1 wherein said set identifiers comprise different colors.

4. A method according to claim 3 wherein the selection of said colors provides a maximum contrast.

5. A method according to claim 1 wherein said labels are provided with adhesive surfaces for attaching them on said components.

6. A method according to claim 1 wherein said structure comprises a cabinet and said components comprise panels.

7. A method according to claim 1 wherein said components are cut and said plan and labels are produced by a suitably programmed CNC router.

8. A method according to claim 1 wherein each label of said at least one of said plurality of labels is provided with a second distinctive, readily visable identifier denoting the association of said first mentioned structure with a second structure.

9. A method according to claim 8 wherein said first mentioned set identifier comprises a color and said second mentioned structure identifier comprises a graphic design.

10. A method according to claim 8 wherein said components comprise panels, said first mentioned structure comprises a cabinet formed of said panels and said second mentioned structure comprises an ensemble of said cabinets.

* * * * *